United States Patent Office 3,063,245
Patented Nov. 13, 1962

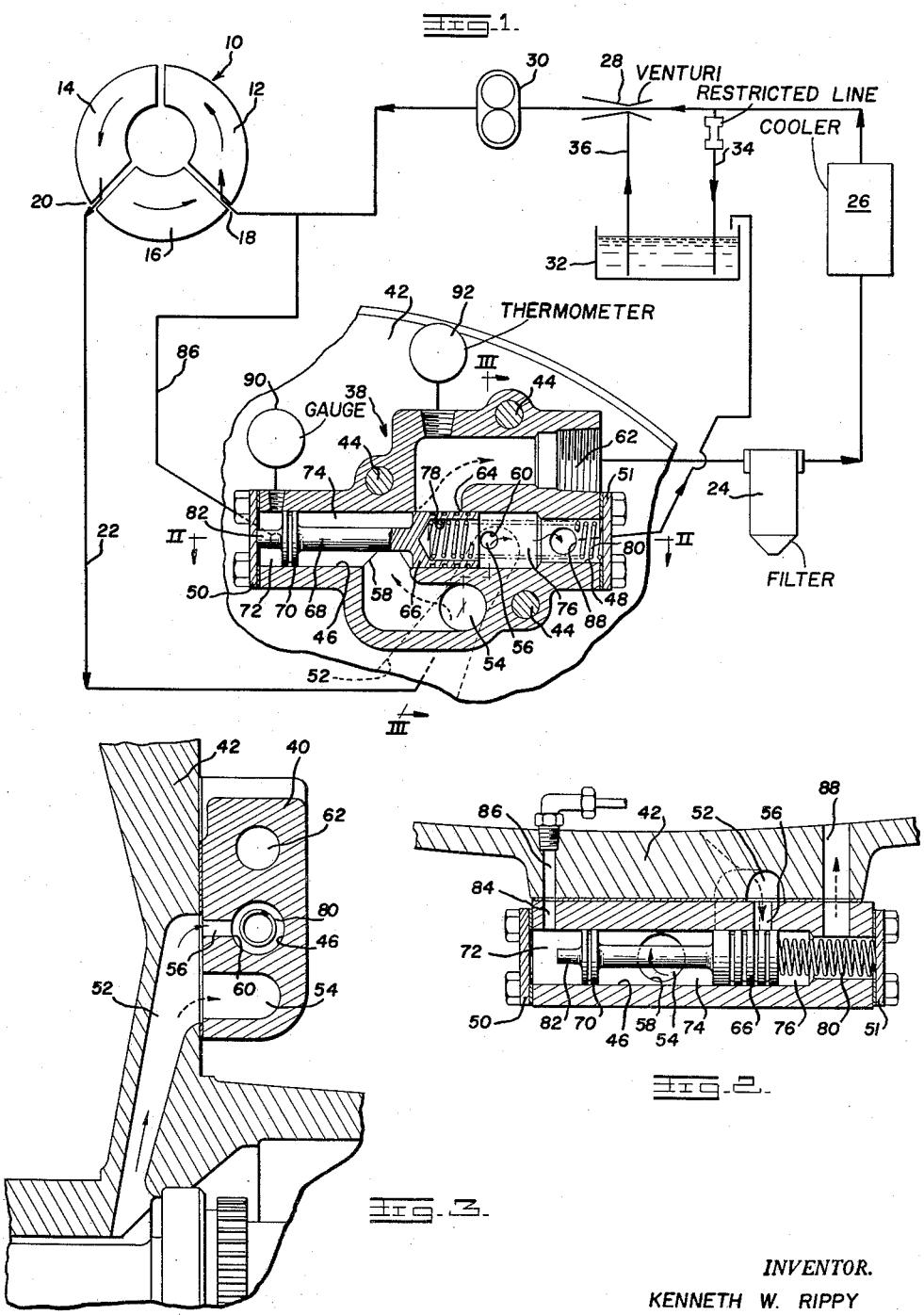

3,063,245
TORQUE CONVERTERS
Kenneth W. Rippy, Gainesville, Tex., assignor, by mesne assignments, to Armco Steel Corporation, Middletown, Ohio, a corporation of Ohio
Filed Oct. 28, 1959, Ser. No. 849,395
9 Claims. (Cl. 60—54)

This invention relates to torque converters and, more particularly, to systems for purging air from the circulating liquid in a torque converter.

In simplest form, a torque converter customarily includes casing means defining a toroidal working chamber filled with liquid and in which are disposed an impeller, a turbine element and a stator, the input shaft being connected to the impeller and the output shaft to the turbine element. In operation, the liquid is circulated through a circuit exterior to the working chamber, such circuit normally including a cooler, a filter, a liquid sump and a circulating pump. During normal operation, the liquid is maintained relatively free from entrained air, both in the working chamber of the torque converter and in the exterior circuit. When the torque converter is shut down, however, fluid drains from the working circuit to the sump, the amount of such "drain down" depending upon the design of the particular torque converter. The fluid which drains from the working chamber is, of course, automatically replaced by air. Upon starting up of the converter, with the attendant vigorous movement of the liquid in the working chamber, this air becomes entrained in the liquid. Such entrainment of air in the working liquid is highly objectionable, causing cavitation at the impeller and decreasing the effective density of the working liquid, so that the efficiency of the torque converter is decreased, and it is accordingly highly desirable to eliminate the air from the liquid and from the working chamber as promptly and as effectively as is possible during starting of the converter.

In certain torque converter applications the exterior liquid circuit in which the working chamber of the converter is connected includes a sump arranged in the circuit in such a manner that all of the fluid flowing in the exterior circuit must pass through the sump. Commonly referred to as an "open circuit," such an arrangement has the advantage that entrained air is eliminated inherently in the sump. However, the use of an open circuit, with all of the fluid passing through the sump, has the disadvantage that the energy supplied to the circulating fluid by the pump or pumps is not conserved. The use of a "closed circuit," in which the circulating fluid ordinarily by-passes the sump during operation of the converter, has the advantage of retaining the energy in the circulating fluid.

One object of the invention is to provide, in combination with a torque converter, novel and effective means for automatically causing the removal of air or other gases from the working chamber and from the liquid in the circulatory system of the converter.

Another object is to provide, in combination with a torque converter having a working chamber and a circulatory system exterior thereto, a control means effective first to cause removal of air or other gases from the working chamber and circulatory system and then to automatically cause a desired normal circulation of the gas-free liquid.

A further object of this invention is to provide means for automatically purging entrained gas from the converter circulating liquid when the converter is initially started and for subsequently regulating the flow of the circulating liquid in response to the pressure at the converter inlet.

Yet another object is to provide, in combination with a torque converter and an exterior circulating system of the at-least-substantially closed type, automatic means effective to purge entrained gas from the circulating liquid, so that advantages of both the closed and open types of circulating systems are attained.

In order that the manner in which these and other objects are attained, in accordance with the invention, can be understood in detail, reference is had to the accompanying drawings, which form a part of this specification, and wherein:

FIG. 1 is a semi-diagrammatic view of a torque converter system embodying the invention, a control valve forming part of the invention being shown in vertical section;

FIG. 2 is a horizontal sectional view taken on line 2—2, FIG. 1, and

FIG. 3 is a sectional view taken on line 3—3, FIG. 1.

Referring now to the drawing in detail, a torus 10 of a torque converter is schematically shown as comprising an impeller 12, a turbine or rotor 14 and a stator 16 arranged in conventional fashion to transmit torque from a driving input shaft to a driven output shaft. The torus 10 is also provided with an inlet 18 and an outlet 20 via which the circulating fluid respectively flows into and from the torus.

Inlet 18 and outlet 20 are connected to the operating liquid circulatory system comprising a primary flow path 22 in which a filter 24, a cooler 26, a venturi 28 and a gear pump 30 are arranged in series.

An open sump 32 contains sufficient liquid to replace liquid losses which normally occur when the converter is operating. A restricted line or conduit 34 extends from flow path 22, at a point adjacent to the inlet to venturi 28, to sump 32 and is adapted to bleed air from the liquid, the air being present because it accumulates in the cooler when the converter is shut down. A conduit 36 extends from sump 32 to the throat section of venturi 28 for conducting make-up liquid from the sump to the primary flow path 22.

Venturi 28 is designed to provide sufficient make-up liquid to replace that bled out through line 34 and that which is lost by leakage at the seals. In addition, venturi 28 maintains sufficient pressure at the inlet to gear pump 30 to minimize cavitation therein. In one typical installation, mentioned here for the purpose of illustration, the venturi maintains the gear pump inlet pressure in the range of from 1 p.s.i. to 7 p.s.i. which pressures correspond respectively to idle and maximum engine speeds of the engine which drives the input shaft.

A control valve, indicated generally by reference numeral 38, is operatively connected to the circulatory system for bleeding entrained air or gas from the circulating liquid when the converter is started and thereafter for regulating the flow of liquid in response to the converter inlet pressure. Control valve 38 is provided with a casing 40 attached to main casing 42 of the torque converter, as by a plurality of bolts 44.

Casing 40 is formed with a cylindrical bore 46 which extends substantially throughout the length of the casing and terminates in a bore 48 of reduced diameter. The outer end of bore 46 is closed by means including an end plate 50. The outer end of bore 48 is covered by means including an end plate 51. The converter casing 42 is provided with a passage 52 which forms a portion of the primary flow path 22 and which terminates at inlet means, comprising inlets 54 and 56, formed in the abutting back face of valve casing 40. Fluid flows from inlets 54 and 56 to bore 46 through ports 58 and 60 respectively. Casing 40 is also provided with an outlet 62 connected in flow path 22 upstream from filter 24. Fluid can flow from 46 to outlet 62 through a port 64 located between ports 58 and 60.

A cylindrical movable valve member 66 is disposed within bore 46 for controlling the flow of fluid through valve 38 and is connected by a valve stem 68 to a piston 70. An expansible chamber 72, a central flow chamber 74 and a bleed chamber 76 are thus provided. Valve member 66 and piston 70 are slidable within bore 46 and are provided with peripheral grooves to prevent or limit fluid leakage between chambers 72, 74 and 76.

Valve member 66 is also formed with an axially disposed blind aperture 78 in which is disposed one end of a helical compression spring 80. The other end of spring 80 abuts right end plate 51, and the spring thus biases valve member 66 and piston 70 to the left, as viewed in FIG. 1. Movement in this direction is limited by a stop member 82 which contacts end plate 50 in the limiting position. The movement of valve member 66 in the other direction is limited by the shoulder formed between bores 46 and 48.

Casing 40 is further provided with a passage 84 which communicates with chamber 72 and is connected to one end of a pressure line 86 extending within casing 42 of the converter. The other end of line 86 is connected to flow line 22 adjacent inlet 18 for transmitting the inlet pressure to chamber 72. An outlet passage 88 is in communication with chamber 76 and extends through casings 40 and 42, being adapted to bleed gas from the circulatory system to atmospheric pressure, preferably delivering to sump 32. A pressure gage 90 may be connected to casing 40 and chamber 72 to indicate the inlet pressure. Similarly, a thermometer 92 may be mounted on casing 40 to indicate the temperatures of the liquid passing through outlet 62.

From FIG. 1, it will be noted that the working chamber of the torque converter is connected in an exterior circuit of the substantially closed type, the working chamber of the converter being in series with cooler 26, venturi 28 and pump 30, the sump 32 being connected to the circuit only via branch lines 34 and 36.

*Operation*

When the torque converter is shut down, spring 80 biases valve member 66 to the position shown in FIG. 1. In this position, stop member 82 abuts end plate 50 and valve member 66 uncovers port 60 and covers port 64 so that fluid can flow from passage 52 through inlet 56, port 60 and chamber 76 to outlet 88. The direction of this flow is indicated by the solid flow lines in FIGS. 1 and 3 and by the dotted flow lines in FIG. 2.

Furthermore, when the torque converter is shut down, the circulating liquid has drained down in torus 10 and cooler 26 with resultant entrapment of air therein. When the converter is placed in operation, gear pump 30 and impeller 12 force liquid and entrained air along flow path 22. The air entrapped in cooler 26 is bled to sump 32 through the restricted line 34, so that only substantially air-free liquid flows through venturi 28. This liquid flows through venturi 28, picks up liquid from sump 32 through line 36, and then flows through gear pump 30 into torus 10. The liquid in the torus is agitated, so that the air in the torus is trapped in the liquid. The liquid-entrapped air flows through outlet 20 and then along path 22, through passage 52 and valve 38, along the path previously described from inlet 56 to outlet 88.

Inlet 56 is sufficiently restricted to create a back pressure within path 22 in response to a flow of liquid. It is obvious that the back pressure thus created is a function of the viscosity of the fluid. When air is entrained in the circulating liquid, the viscosity of the resultant mixture is less than the viscosity of air-free liquid. Inlet 56 is so designed that the pressure at inlet 18, when the converter is initially started and the liquid leaving the torus contains entrapped air, is insufficient to move piston 70 and valve member 66 against the bias of spring 80. However, when substantially all the air has been bled through outlet 88, the increased viscosity of the liquid causes a greater back pressure to be created, and the pressure at inlet 18 accordingly increases. This increase in pressure is transmitted through line 86 and passage 84 to chamber 72 and is sufficient to move piston 70 and valve member 66, against the bias of spring 80, to a position similar to that shown in FIG. 2, valve member 66 now uncovering port 64 and closing port 60. In this position, liquid flows through valve 38 along the path comprising inlet 54, port 58, chamber 74, port 64 and outlet 62. This flow path is represented by the dotted flow lines in FIGS. 1 and 3, and by the solid flow lines in FIG. 2.

It is obvious that the position of valve member 66 is governed by the stiffness of spring 80, the unbalanced areas of piston 70 and valve member 66 and the pressure differentials acting upon these unbalanced areas. Under the normal running conditions of the torque converter, valve member 66 is movable through a plurality of positions in response to variations in the pressure at inlet 18 for regulating the flow of liquid through the system. Thus, any change in the inlet pressure causes a movement of valve member 66, which movement varies the flow area through port 64 to change the pressure drop through port 64 to change the pressure drop through valve 38 in a direction which tends to offset the initial change in the inlet pressure, with the resultant regulation of the flow of liquid. Such regulating action of valve 38 is effective, for example, to maintain a substantially constant pressure in the working chamber during normal operation of the converter.

When the converter is subsequently shut down, the fluid pressure within the system decreases, allowing spring 80 to move valve member 66 to the shut down position.

What is claimed is:

1. In combination with a hydraulic torque converter of the type comprising a working chamber connected in a liquid circulatory system: means for circulatory liquid through said system, means operatively connected to the working chamber to purge air from the liquid when the air-liquid ratio is above a predetermined value and the liquid is circulating through the system as the torque converter is placed in operation, means responsive to the air-liquid ratio when the liquid is flowing through said system to inversely vary the pressure of the liquid at the working chamber inlet, and control means responsive to hydraulic pressure in said system at the inlet of the working chamber and operatively connected to said first-mentioned means to render the same ineffective when said pressure increases to a predetermined value.

2. In combination with a hydraulic torque converter of the type comprising a working chamber having its inlet and outlet serially connected in a liquid circulatory system, the working chamber and circulatory system being such that air collects in the working chamber when the torque converter is shut down: means for circulating liquid through said system, flow control means connected to the outlet of the working chamber, said flow control means being alternatively operable to (1) bleed liquid and air entrained therein from the circulatory system when the air-liquid ratio is above a predetermined value and the liquid is circulating through the system and (2) allow an operating flow of liquid through the system, means responsive to the air-liquid ratio when the liquid is flowing through said system to inversely vary the pressure of the liquid at the input side of the working chamber, means to make up liquid bled from said circulatory system, and means responsive to the hydraulic pressure in the system on the input side of the working chamber operatively connected to said flow control means to control the same to bleed liquid and air entrained therein from the system so long as said pressure is below a predetermined value.

3. In a hydraulic torque converter of the type comprising a working chamber connected in a liquid circulatory system, the combination of means for circulating liquid through said system, torque converter valve means for purging air from the circulatory system comprising a valve casing formed with inlet means and first and second outlets, a valve member cooperating with said casing and disposed for movement between a first position wherein fluid can flow from said inlet means to said first outlet and a second position wherein fluid can flow from said inlet means to said second outlet, said first outlet communicating with the atmosphere for purging air from the circulatory system when the air-liquid ratio is above a predetermined value and the liquid is circulating through the system said inlet means and said second outlet being serially connected in the circulatory system, means to make-up any liquid which flows through said first outlet, means responsive to said air-liquid ratio when the liquid is flowing through said system to inversely vary the pressure of the liquid upstream of said valve means and pressure responsive means operatively connected to said valve means and responsive to the increase in back pressure upstream of said valve means caused by flow decrease in flow ratio of substantially air-free liquid through said first outlet for shifting said valve member from said first position to said second position.

4. In combination with a torque converter of the type comprising a working chamber having a fluid intake and a fluid discharge serially connected in a circulating system: means for circulating liquid through said system, valve means comprising inlet means, a first outlet, a second outlet and a movable valve member, said movable valve member being disposed for movement between a first position, in which said inlet means is in communication with said first outlet, and a second position, in which said inlet means is in communication with said second outlet, said inlet means being in communication with the discharge of the working chamber, said first outlet communicating with the atmosphere and said second outlet communicating with the intake of the working chamber via said circulating system, means responsive to the air-liquid ratio of fluid flowing through said first outlet for inversely varying the pressure of the liquid at the intake of the working chamber, and control means responsive to hydraulic pressure at the intake of the working chamber, said control means being operative to maintain said movable valve member in said first position when said pressure is below a predetermined value and to actuate said movable valve member to said second position when said pressure attains said predetermined value.

5. In combination with a hydraulic torque converter of the type comprising a working chamber having a liquid intake and a liquid discharge serially connected to a circulatory system: means for circulating liquid through said system, valve means connected to the discharge of the working chamber and operative alternatively to deliver fluid from the working chamber through the circulatory system or to a point exterior to the circulatory system, means responsive to the air-liquid ratio of fluid flowing through said valve means to said point to inversely vary the pressure of the liquid at the intake of the working chamber, means to make-up any liquid which flows to said point, and valve control means responsive to hydraulic pressure at the intake of the working chamber and connected to control said valve means to deliver the fluid from the working chamber to said exterior point so long as said hydraulic pressure is below a predetermined value.

6. In combination, a torque converter comprising a working chamber having a liquid intake and a liquid discharge serially connected to a liquid circulatory system, means for circulating liquid through said system, a valve having an inlet, a first outlet, a second outlet, a movable valve member disposed for movement between a first position, in which said inlet communicates with said first outlet, and a second position, in which said inlet communicates with said second outlet, biasing means normally urging said valve member to said first position, and means defining a fluid pressure cylinder, introduction of fluid under a predetermined pressure being effective to actuate said valve member to said second position; means to inversely vary the pressure at the intake of said working chamber in response to the air-liquid ratio of the circulating liquid; conduit means connecting said inlet to the discharge of said working chamber, conduit means connecting said second outlet to the intake of said working chamber via said circulating means and conduit means connecting between said fluid pressure cylinder and the intake of said working chamber, said first outlet communicating with the atmosphere.

7. In combination, a torque converter comprising a working chamber having a liquid discharge and a liquid intake; a sump; a venturi pump; a positively driven pump, said venturi pump and said positively driven pump being connected in series to said intake and said venturi pump being arranged to draw make-up liquid from said sump; valve means connected to receive the fluid from said discharge, said valve means having first and second outlets, said first outlet communicating with the atmosphere and said second outlet being connected to said working chamber via the series combination of said pumps; means responsive to the air-liquid ratio of the circulating liquid to vary the pressure at the inlet of said working chamber; and control means responsive to the hydraulic pressure between said positively driven pump and said intake of said working chamber, said control means being operatively connected to said valve means to cause the same to deliver the fluid from said working chamber to said first outlet so long as said pressure is below a predetermined value and to deliver the fluid from said working chamber to the series combination of said pumps when said pressure exceeds said value.

8. The apparatus of claim 7 wherein said second outlet is connected to the series combination of said pumps via a cooler and a restricted branch line is connected to the fluid line between said cooler and said venturi pump, said branch line delivering to said sump and being effective to bleed off fluid-entrapped air from said cooler.

9. In combination, a hydraulic torque converter having a working chamber provided with an inlet and an outlet, an at least substantially closed fluid circulating system connected to the inlet and outlet of said working chamber; means for circulating liquid through said system, valve means connected in said fluid circulating system on the outlet side of said working chamber, said valve means being operative in one position to direct fluid from said working chamber through said circulating system and in another position to direct fluid from said working chamber to a point exterior to said circuit, means responsive to the air-liquid ratio of the circulating fluid to inversely vary the pressure on the input side of said working chamber; means to make-up any liquid which flows through said valve means to said exterior point; and control means responsive to the hydraulic pressure on the input side of said working chamber for maintaining said valve means in said other position so long as said pressure is below a predetermined value.

References Cited in the file of this patent

UNITED STATES PATENTS

| | | |
|---|---|---|
| 1,910,696 | Kiep | May, 23, 1933 |
| 2,453,877 | Trail | Nov. 16, 1948 |
| 2,837,285 | Urban | June 3, 1958 |